(12) United States Patent
Glaab

(10) Patent No.: US 6,459,793 B1
(45) Date of Patent: Oct. 1, 2002

(54) CABLE TELEVISION SETBACK DECODER AUTOMATIC CONTROL

(75) Inventor: Joseph B. Glaab, New Hope, PA (US)

(73) Assignee: General Instrument Corporation, Horsham, PA (US)

( * ) Notice: Subject to any disclaimer, the term of this patent is extended or adjusted under 35 U.S.C. 154(b) by 816 days.

(21) Appl. No.: 09/192,631

(22) Filed: Nov. 16, 1998

Related U.S. Application Data

(63) Continuation of application No. 08/914,968, filed on Aug. 20, 1997, now Pat. No. 5,862,219, which is a continuation of application No. 08/440,201, filed on May 12, 1995, now abandoned.

(51) Int. Cl.[7] .............................................. H04N 7/167
(52) U.S. Cl. ...................................... 380/210; 380/241
(58) Field of Search ........................... 380/10, 20, 210, 380/241

(56) References Cited

U.S. PATENT DOCUMENTS

| | | |
|---|---|---|
| 4,348,691 A | 9/1982 | Mistry |
| 4,547,802 A | 10/1985 | Fogarty et al. |
| 4,790,010 A | 12/1988 | Sgrignoli |
| 4,827,509 A | 5/1989 | Izumiyama |
| 4,864,613 A | 9/1989 | Van Cleave |
| 4,910,771 A | 3/1990 | Hosoya et al. |
| 4,922,532 A | 5/1990 | Farmer et al. |
| 4,926,477 A | 5/1990 | Paik |
| 5,206,908 A | 4/1993 | Kikuchi et al. |
| 5,237,420 A | 8/1993 | Hayashi |
| 5,274,706 A | 12/1993 | Sugiyama |
| 5,319,709 A | 6/1994 | Raiser et al. |
| 5,392,352 A | 2/1995 | Han |

*Primary Examiner*—Stephen C. Buczinski
(74) *Attorney, Agent, or Firm*—Volpe and Koenig, P.C.

(57) ABSTRACT

A setback decoder monitors the IF output from a cable-ready receiver and automatically provides a descrambled audio/video signal back to the receiver for output to the subscriber. When the receiver is tuned to a CATV channel which provides signals in a scrambled format, the decoder detects the scrambled signal, determines whether the subscriber is authorized to view the selected program, and descrambles the signal to provide a descrambled output signal to the receiver. The receiver detects the audio/visual output from the decoder and automatically outputs the audio/visual information to the subscriber.

4 Claims, 11 Drawing Sheets

CABLE TELEVISION SETBACK DECODER AUTOMATIC CONTROL

REFERENCE TO OTHER APPLICATIONS

This is a continuation of application Ser. No. 08/914,968; filed Aug. 20, 1997; now U.S. Pat. No. 5,862,219 which is a continuation of application Ser. No. 08/440,201, filed May 12, 1995 (now abandoned).

BACKGROUND OF THE INVENTION

1. Field of the Invention

This invention relates generally to cable television receivers. More specifically, it pertains to a setback decoder which automatically detects when a scrambled signal is input to a receiver and provides a descrambled output signal to the receiver without requiring any control messages between the decoder and the receiver.

2. Description of Related Art

A typical CATV subscriber installation includes a settop descrambler which is connected between the CATV service provider and the subscriber's television or video cassette recorder (VCR). The descrambler includes a tuner, for tuning the descrambler to a selected CATV channel, and a descrambling module, for providing descrambling of scrambled premium channels that the subscriber is authorized to view. A descrambled video signal is output from the descrambler to the television or VCR on a predetermined carrier frequency, typically corresponding to television channels 3 or 4.

Since the descrambler typically provides a single channel output to the television, many of the built-in functions of the television may become inoperative. For example, the "picture-in-picture" feature requires dual tuners for simultaneous receipt of video signals on two television channels. Since descramblers provide only a single output, the "picture-in-picture" feature becomes inoperative. Additionally, subscribers are often frustrated by the need for multiple remote controllers, one for controlling the descrambler, a second for controlling the television set, and possibly a third for the VCR.

To eliminate the need for a separate tuner within the descrambler, manufacturers have offered televisions with broadband tuners which are capable of accessing the entire CATV frequency spectrum. However, these televisions do not include descrambling capabilities.

Most recently, cable-ready receivers are being developed which receive a radio frequency (RF) CATV input signal and provide an intermediate frequency (IF) output to an associated descrambler. These receivers require the use of a complicated protocol and signaling arrangement between the receiver and the descrambler in order to effectively detect and descramble scrambled CATV input signals viewing by a subscriber. Although the control. signaling between the receiver and the descrambler provides full functionality of the receiver while descrambling the desired CATV premium channel, this complex arrangement is costly and difficult to manufacture.

Accordingly, there exists a need for a simple receiver and descrambler arrangement which provides descrambling of scrambled CATV input signals.

SUMMARY OF THE INVENTION

The present invention comprises a setback decoder which monitors the IF output from a cable-ready receiver, such as a television or VCR, and provides a descrambled audio and video (A/V) signal back to the receiver. When the received CATV signal is scrambled, the decoder automatically detects the scrambled signal, determines whether the subscriber is authorized to view the selected program, and descrambles the signal to provide descrambled A/V output to the receiver. The receiver detects the video output signal from the decoder and outputs the information to the subscriber. Since the decoder automatically detects the presence of a scrambled CATV signal and the receiver automatically detects the input of a descrambled output signal from the decoder, no control messages are exchanged between the receiver and the decoder.

Accordingly, it is an object of the present invention to provide a setback decoder for automatically detecting and descrambling scrambled CATV signals and providing a descrambled output.

Other objects and advantages of the system will become apparent to those skilled in the art after reading the detailed description of a presently preferred embodiment.

DETAILED DESCRIPTION OF THE PREFERRED EMBODIMENT

Figure 1:
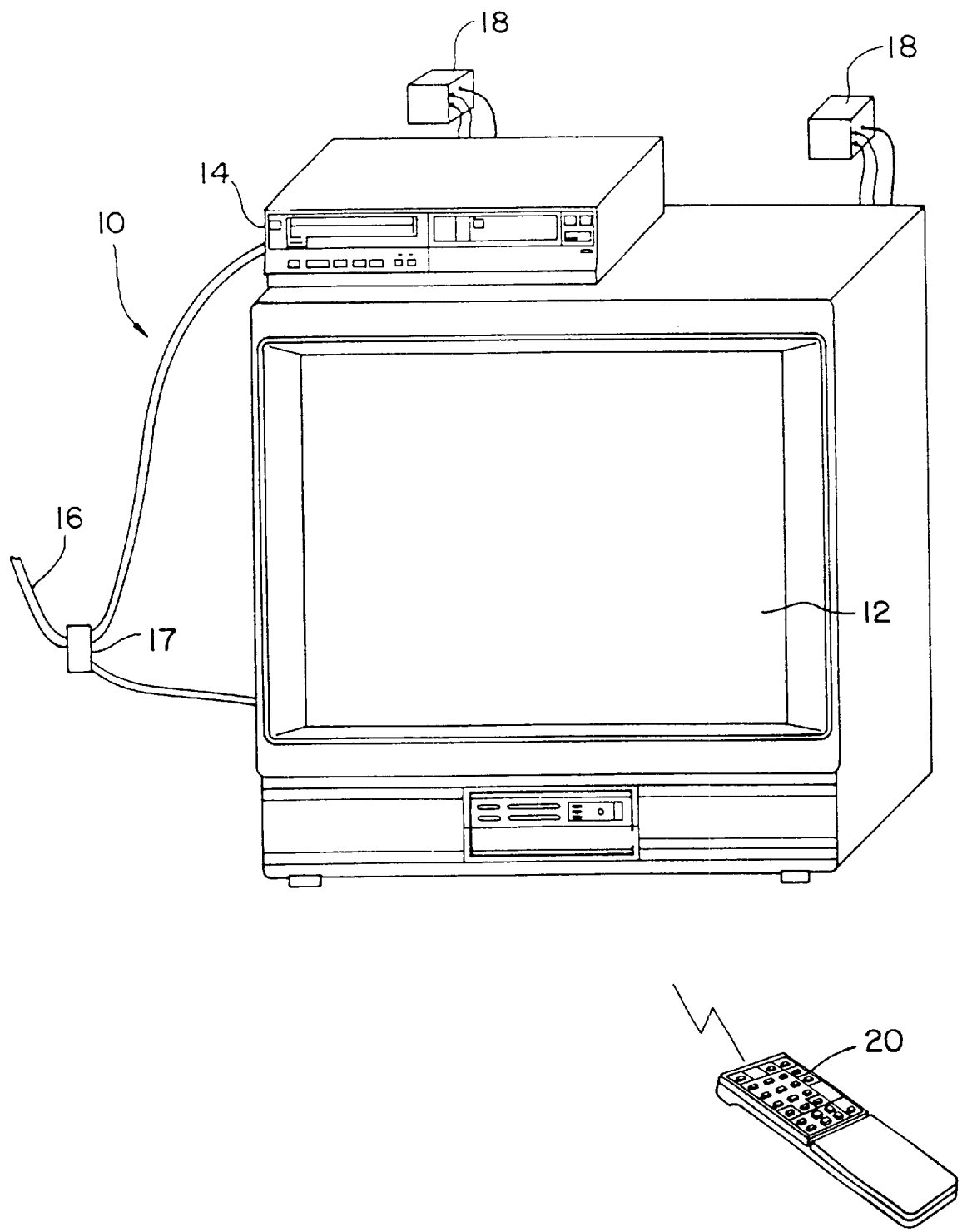
FIG. 1 is a CATV subscriber installation made in accordance with the teachings of the present invention.

The preferred embodiment of the present invention is shown in FIG. 1. The CATV subscriber installation 10 includes one or more cable-ready receivers, which are shown in FIG. 1 as a television 12 and a VCR 14. The receivers 12, 14 are connected to a CATV input 16 and a splitter 17 to receive programming signals from the CATV provider. The input line 16 is connected to a conventional fiber-coax CATV network. Alternatively, the input line 16 may be connected to a microwave antenna to receive "wireless cable" programming. A received CATV signal comprises a carrier signal and A/V information. Each receiver includes a frequency agile broadband tuner 36 (shown in FIG. 3), which is selectively tuned to specific CATV channels. The output from the tuner 36 is externally accessible on an intermediate frequency (IF) carrier.

Figure 2:
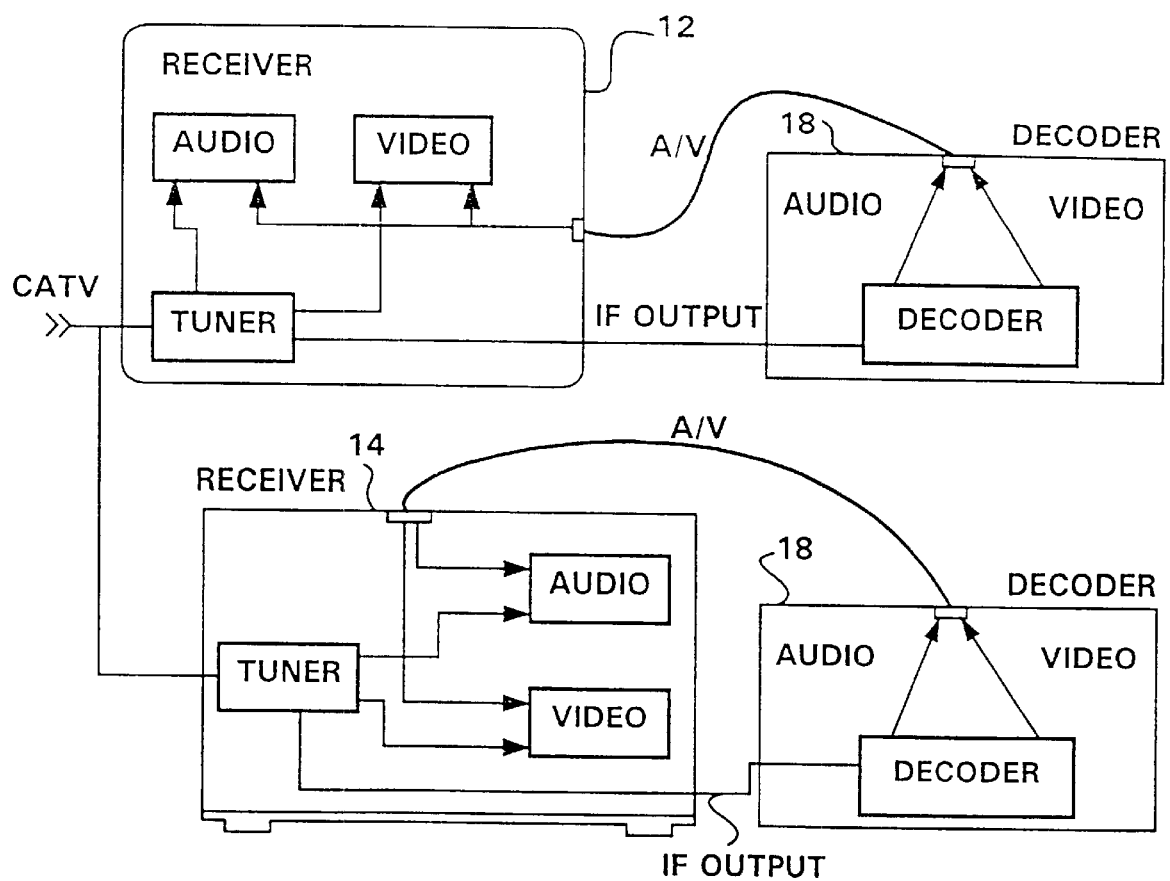
FIG. 2 is a block diagram of cable-ready receivers which are individually coupled to the decoder of the present invention.

As shown in FIG. 2, each receiver 12, 14 is individually connected to a decoder 18, which automatically detects when a scrambled CATV signal is received by the receiver 12, 14 and provides a descrambled A/V signal to the receiver 12, 14, as will be described in detail hereafter. The receivers 12, 14 are controlled by the subscriber via an IR remote control 20, for selection of a desired CATV channel.

Figure 3:
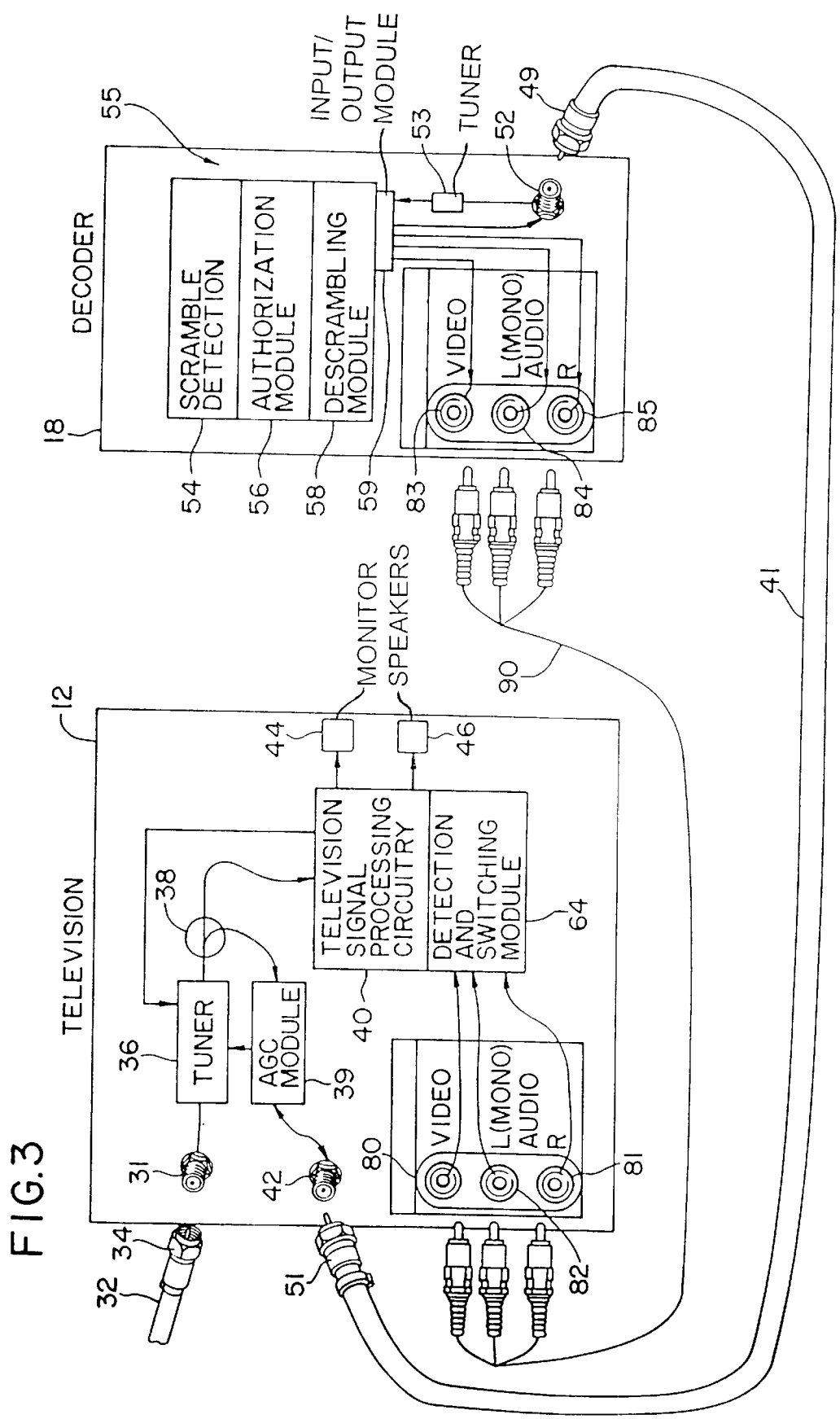
FIG. 3 is a block diagram of a cable-ready receiver and a decoder made in accordance with the teachings of the present invention.

The preferred embodiment of the present invention will be described with reference to FIG. 3. The CATV receiver is shown in FIG. 3 as a television 12. However, the receiver may comprise a VCR 14 or any other type of cable-ready device which accepts a broadband RF input signal and outputs the received A/V information on an IF carrier. The television 12 is coupled to the CATV network via a coaxial cable 32 terminated with an F-type connector 34 at a CATV input port 31. The CATV operator provides broadcast and interactive video and audio programming on a plurality of 6 MHz channels to the subscriber over the full bandwidth of the CATV network, which may be up to 1 Ghz.

A tuner 36, coupled to the CATV port 31, tunes to the specific carrier frequency of the channel selected by the subscriber. The tuner 36 removes the carrier frequency and amplifies the resulting A/V signal. The gain of amplifier is controlled so that the output of the tuner 36 remains essentially constant despite variations in strength of the CATV input signal. When a "normal" or unscrambled CATV signal is received by the tuner 36, the amplifier is controlled by the television signal processing circuitry 40. However, as will be explained in detail hereinafter, when a scrambled CATV signal is received, the decoder module 18 will control the gain of the amplifier through the AGC module 39.

The received A/V signal is output from the tuner 36 on an IF carrier to a signal splitter 38. If no descrambling is required, the A/V signal is processed by the signal processing circuitry 40. Audio and video information is separated and processed by the signal processing circuitry 40 to provide video output to a monitor 44 and audio output to speakers 46. A subscriber, therefore, will be able to view and listen to the selected program. A detailed discussion of the signal processing circuitry 40, which is well known to those skilled in the art, is outside the scope of this description.

When scrambled CATV input signals are received by the tuner 36, such as on premium cable television channels, interactive video channels, and pay-per-view channels, the signal processing circuitry 40 will be unable to descramble and process the A/V signal. Therefore, the audio and video programs will be unintelligible. To descramble the A/V signal, the A/V signal is forwarded on a selected IF carrier, preferably 45 MHz, through the signal splitter 38 to an IF/AGC port 42 for use by an external device.

The decoder 18 includes a tuner 53 which is selectively tuned to the IF carrier output from the television 12. The IF/AGC port 52 on decoder 18 and the IF/AGC port 42 on television 12 are connected via a coaxial cable 41, terminated at both ends by F-type connectors 49, 51.

Figure 4:
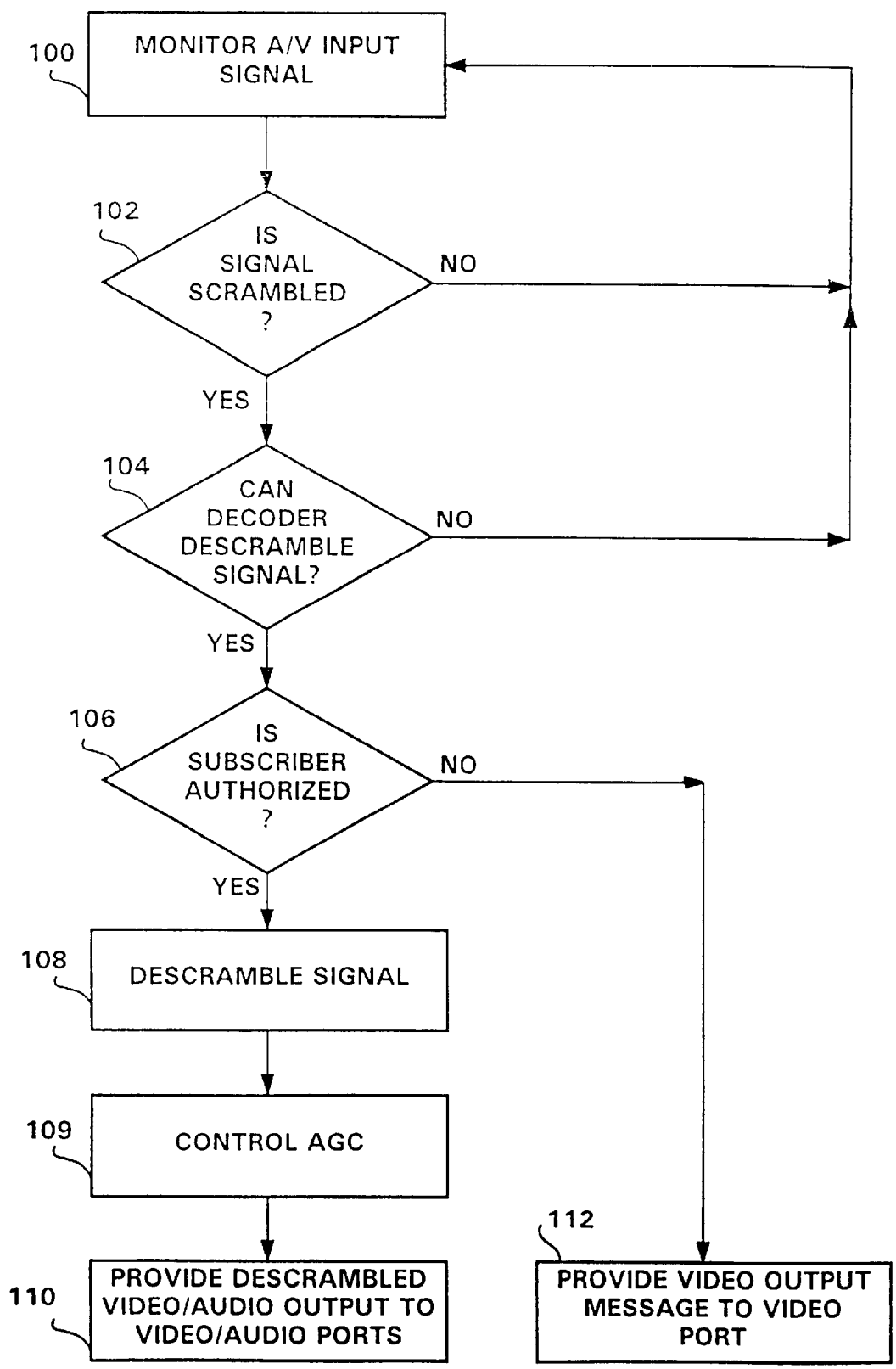
FIG. 4 is a flow diagram of the process used by the processor within the decoder.

A processor 55 within the decoder 18 receives and processes the A/V signal using several software-implemented modules, as shown in FIG. 4. The scramble detection module 54 continually monitors the received A/V signal (step 100). If the scramble detection module 54 detects that the signal is not scrambled (step 102), the processor 55 takes no further actions and no signals are output from the decoder 18. There are many types of audio and video scrambling, scrambling detection, and descrambling techniques that are well known by those skilled in the art. A detailed discussion of these techniques is outside the scope of this invention. If the scramble detection module 54 determines that the signal is scrambled (step 102), the module 54 determines whether the type of scrambling being utilized may be descrambled by the descrambling module 58 (step 104). If the scrambling technique is not supported (i.e. cannot be descrambled) by the descrambling module 58, the decoder 18 takes no further action.

If the technique used to scramble the A/V signal is a compatible scrambling technique, the authorization module 56 determines whether the subscriber is authorized to receive the scrambled video services that have been selected (step 106). As is well known to those skilled in the art, authorization information, such as a subscriber address identifier, is detected on the specific channel being monitored by the decoder 18. This information is compared to an authorization code stored within the memory of the processor 55 to determine if the subscriber is an authorized user.

Figure 11:
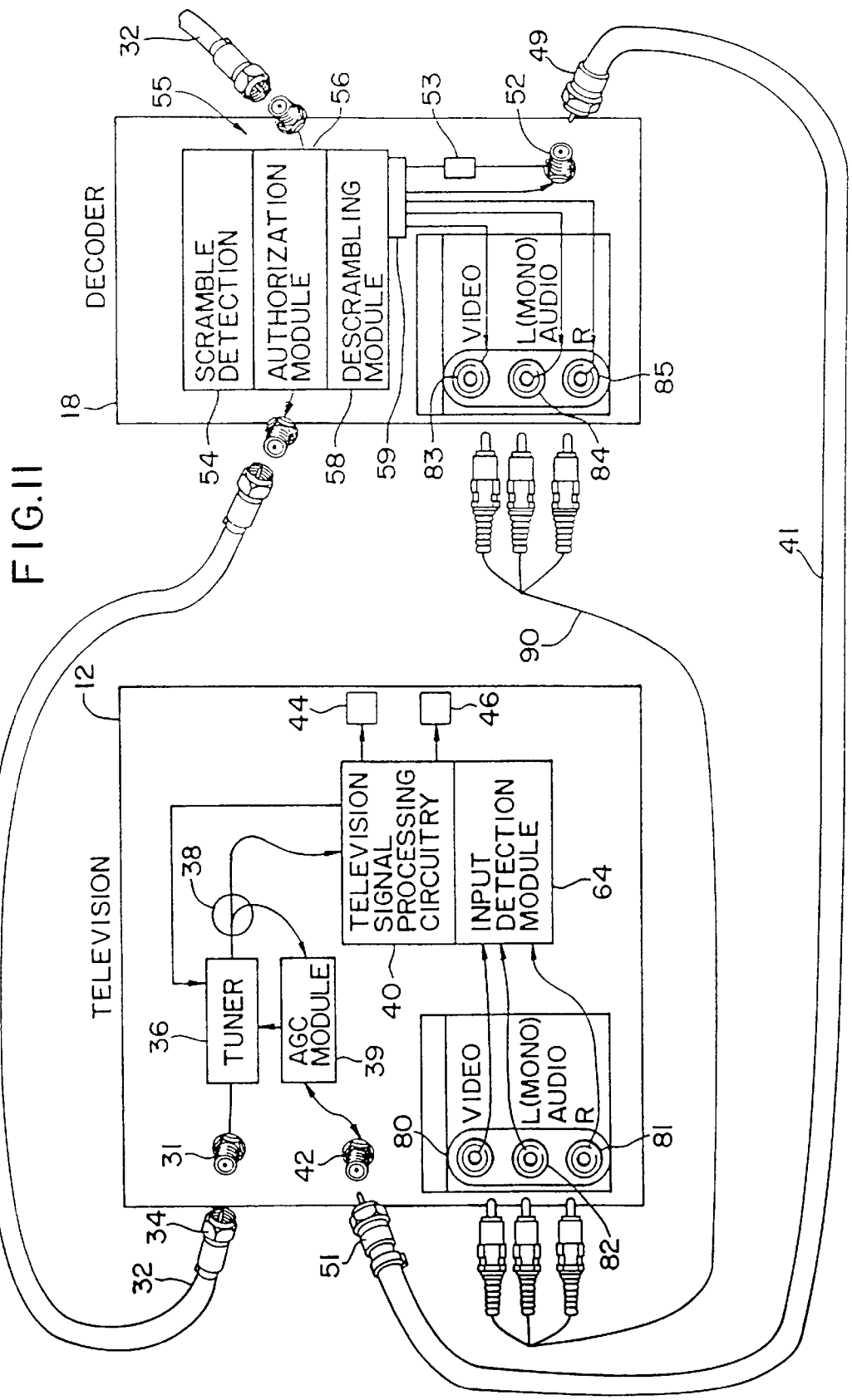
FIG. 11 is a block diagram of a first alternative embodiment of the decoder of FIG. 3.

Alternatively, the CATV scrambling system may use extra RF carriers (out-of-band) to send address, control and authorization data to the access control device. As shown in FIG. 11, the CATV input may "loop through" the decoder 18 prior to entering the television 12. This permits access by the decoder 18 to the extra RF carriers.

If the subscriber is not authorized, the decoder 18 provides a video output signal to the video port 83 (step 112) to inform the subscriber that they have not been authorized to receive the selected service. This message may also include instructions to enable the subscriber to order and pay for the service to become an authorized user. These types of messages are commonly used for pay-per-view video services.

Figure 7:
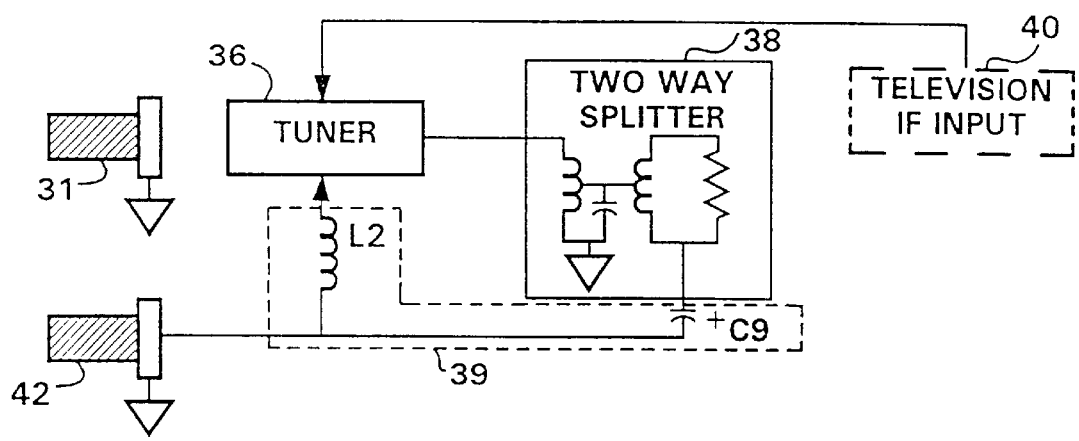
FIG. 7 is a block diagram of the AGC module in the receiver of FIG. 3.

Once the authorization module 56 determines that the subscriber is authorized to receive the service, the A/V signal is descrambled (step 108) by the descrambler module 58. An input/output (I/O) module 59 within the decoder 18 provides a low impedance DC signal to the AGC module 39 through the IF/AGC port 52. As shown in FIG. 7, the low impedance signal from the decoder 18 is input to the tuner 36 and overrides the higher impedance AGC signal from the signal processing circuitry 40. This permits the decoder 18 to automatically control the gain of the tuner's amplifier when a scrambled signal is detected by the decoder 18. No control messages between the television 12 and the decoder 18 are required.

The descrambled baseband A/V signals are output from the input/output (I/O) module 59 to the input detection and switching module 64 via the A/V output ports 83, 84, 85 the shielded cable 90 and the A/V input ports 80, 81, 82. When the detection and switching module 64 detects a signal at the input ports 80, 81, 82, it switches the source of the A/V input provided to the signal processing circuitry 40 from the tuner 36 to the decoder 18. Accordingly, the signal processing circuitry 40 will display descrambled A/V output to the monitor 44 and the speakers 46.

Figure 9:
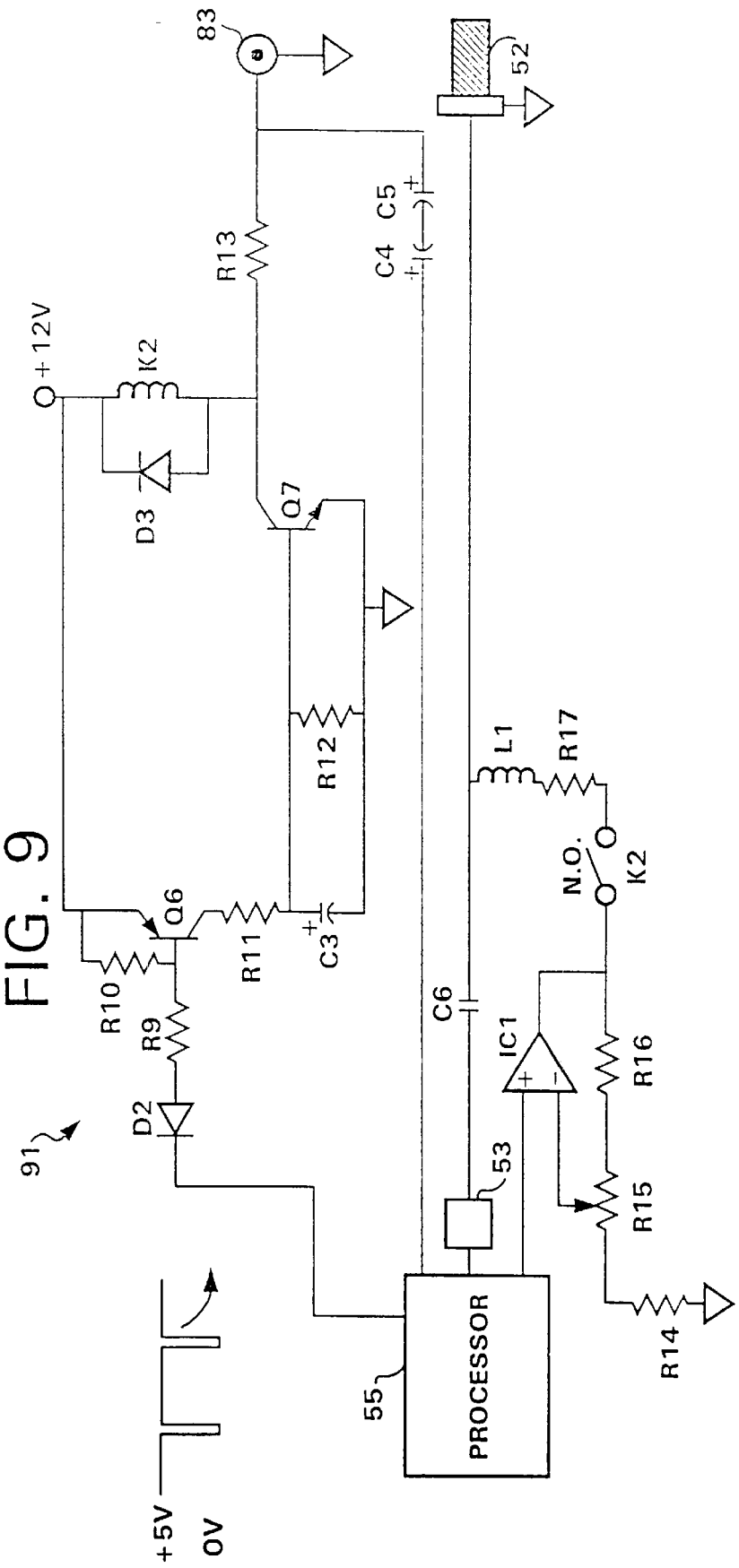
FIG. 9 is a schematic diagram of the video output section used in the decoder of FIG. 3.
Figure 10:
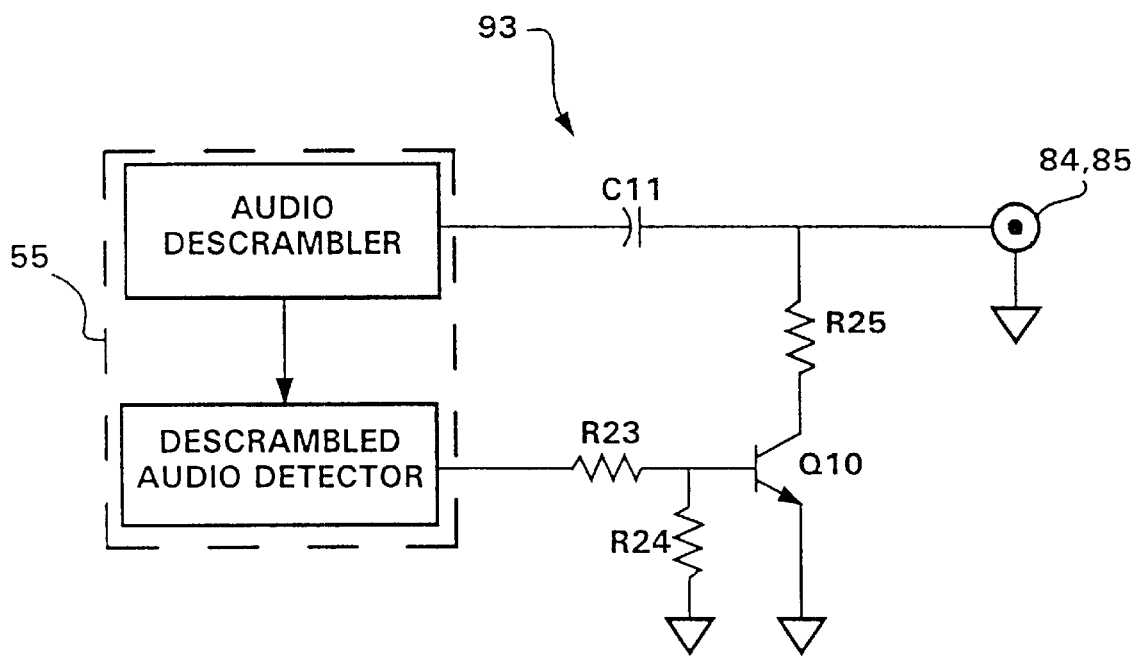
FIG. 10 is the audio output section used in the decoder of FIG. 3.

A more detailed explanation of the I/O module 59 will be presented with reference to FIGS. 9 and 10. The audio and video signals are separately descrambled and output.

The video output section 91 is shown in FIG. 9. The IF carrier with the A/V information is received through port 52. When the scramble detector module 54 detects a scrambled signal, a pulse train is output from the authorization module 56 which provides the descrambling synchronization. Diode D2 turns on transistor Q6 through current limiting resistor R9 when the drive pulses are at 0 VDC. Resistor R10 allows transistor Q6 to turn off when current is no longer applied to the base of transistor Q6. When transistor Q6 is turned-on, current flows across the emitter-collector junction of transistor Q6 through current limiting resistor R11 charging capacitor C3. Capacitor C3 stores energy and ensures that transistor Q7 turns on while the pulses are present.

Transistor Q7 acts as a current sink thereby turning on relay K2. Resistor R12 dissipates the energy across capacitor C3 when the drive pulse is no longer present. Relay K2 closes a pair of normally open contacts which complete the circuit to output a low impedance AGC output signal from the decoder 18 to the external AGC/IF output 52. The descrambled video signals from the processor 55 flow through capacitors C4 and C5 to the output connector 83. When the decoder 18 detects a scrambled signal, and relay K2 is energized, the AGC signal is output from the decoder 18 through operational amplifier IC1 and through current limiting resistor R17 and inductor L1. Resistors R14, R15 and R16 provide the feedback around the operational amplifier and variable gain.

In the same manner, as shown in FIG. 10, descrambled audio signals are descrambled and output from the audio output section 93.

Figure 5:
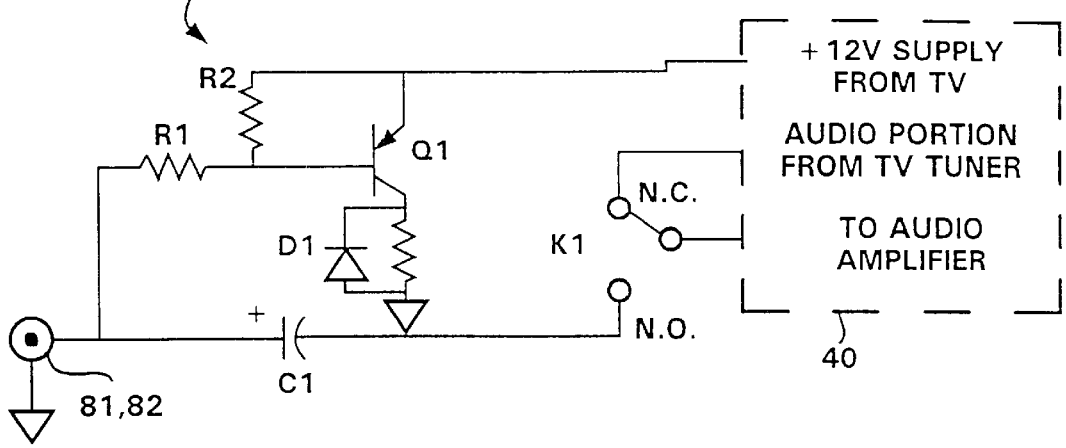
FIG. 5 is a schematic diagram of the audio switching module in the receiver of FIG. 3.

The detection and switching module 64 included within the television 12 will be explained in greater detail with reference to in FIGS. 5, 6 and 8. As shown in FIG. 5, a descrambled audio signal from the decoder 18 is presented to the audio input ports (left and right) 81, 82. In the preferred embodiment, an audio switch 65 is provided for each audio channel (left and right). The audio switching module 65 provides switching from "normal" unscrambled audio signals from the tuner 36 to descrambled audio signals from the decoder 18 using relay K1 and transistor Q1. The audio signals from the decoder 18 have a DC component which is blocked by capacitor C1. Capacitor C1 allows the audio portion of the signal to be amplified. The DC component of the signal flows through current limiting resistor R1 to the base of transistor Q1. A resistor R2 is connected from an available 12 VDC supply from the signal processing circuitry 40 to the base of transistor Q1. This resistor R2 allows transistor Q1 to turn off when current is no longer applied to the base of transistor Q1. The emitter of transistor Q1 is also connected to the 12 VDC supply. The DC component from the decoder 18 turns transistor Q1 on. Current flows from the 12 VDC supply through the emitter-collector junction of transistor Q1 to relay coil K1.

Associated with relay K1 is a set of form C contacts. When relay coil K1 is energized, the contacts switch from the normal audio signals received from the tuner 36 to the descrambled audio signals provided by setback decoder 18. Suppression diode D1 protects transistor Q1 from the reverse inductive surge from relay coil K1 upon de-energization.

Figure 6:
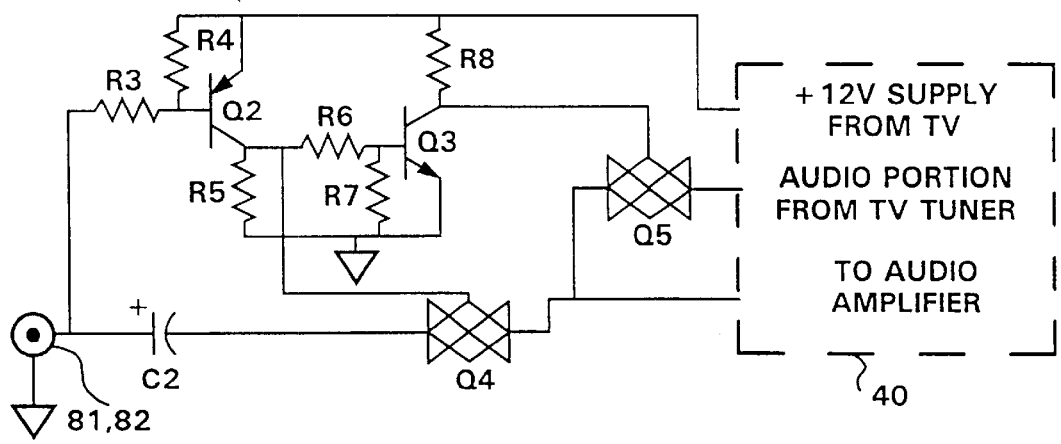
FIG. 6 is a schematic diagram of an alternative embodiment of the audio switching module of FIG. 5.

An alternative embodiment of the audio switching module 65, using CMOS semiconductor switches, is shown in FIG. 6. Each semiconductor switch Q4, Q5 has an input, an output and a control gate. When voltage is applied to the control. gate, the switch conducts. Capacitor C2 blocks the DC portion of the decoder 18 audio signal from entering the audio amplifier within the signal processing circuitry 40. CMOS switch Q5 is controlled by transistor Q3 and CMOS switch Q4 is controlled by transistor Q2. When no input is detected from the decoder 18, CMOS switch Q5 is held in a state of conduction by current flowing through current limiting resistor R8. When a descrambled audio signal is detected, the DC component on the audio signal flows through current limiting resistor R3, turning-on transistor Q2. Resistor R4 allows transistor Q2 to turn off when current is no longer applied to the base of transistor Q2. When transistor Q2 is turned on, current flows across the emitter-collector junction and through current limiting resistor R6, turning-on transistor Q3. When transistor Q3 is turned-on, current flows through resistor R8 through the collector-emitter junction to signal common, thereby acting a[007f] a current sink.

When transistor Q3 is turned on, the collector of transistor Q2 is less positive than when transistor Q2 is turned-off, thereby turning off CMOS switch Q5. In conjunction with turning transistor Q3 on, current also flows through transistor Q2 thereby turning CMOS switch Q4 on. Transistors Q2 and Q3 provide a complimentary switching action for CMOS switches Q4 and Q5.

Resistor R7 provides a ground path from the base of transistor Q3 to signal common allowing transistor Q3 to turn-off when current is no longer applied to the base of transistor Q3 by transistor Q3 when the descrambled audio signal is no longer present.

Figure 8:
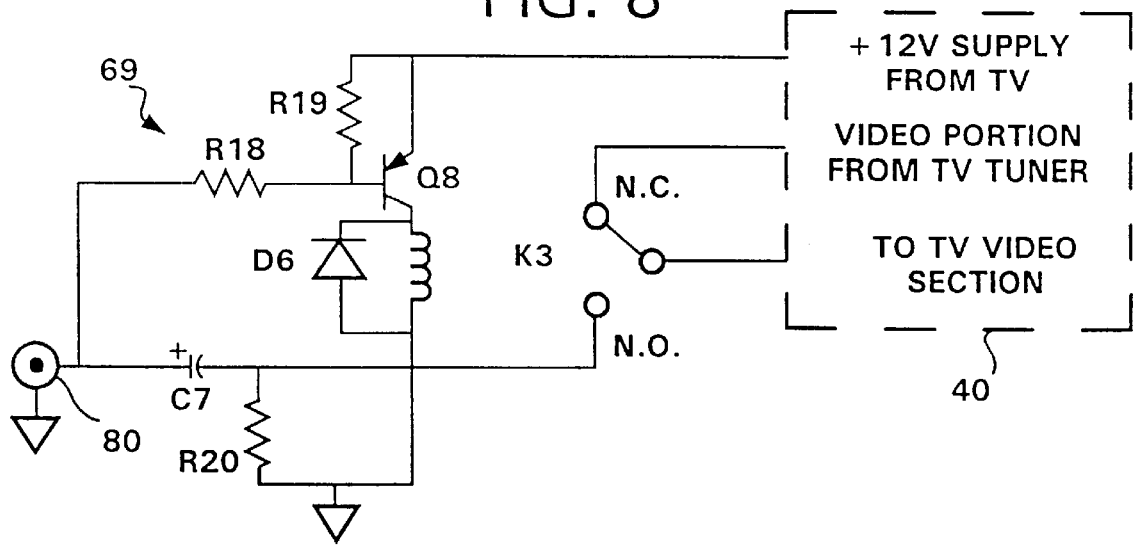
FIG. 8 is a schematic diagram of the video switching module in the receiver of FIG. 3.

Referring to FIG. 8, a video switching module 69 for switching between "normal", or unscrambled video signals, received from the tuner 36 and descrambled video signals from the decoder 18 is shown on FIG. 8. When no signal is present at the input 80 to the module 69, transistor Q8 and relay K3 are turned off, thereby allowing the normal video signal from the tuner 36 to pass through to the signal processing circuitry 40. When a descrambled signal is present at the input 80 to the module 69, the DC component on the signal is blocked by capacitor C7 and is passed to the base of transistor Q8 through current limiting resistor R18. Resistor R19 allows transistor Q8 to turn off when current is no longer applied to the base of Q8. When transistor Q8 is turned on, current flows across the emitter-collector junction of transistor Q8 and energizes relay K3. The associated form C contacts of relay K3 switches the video input to the signal processing circuitry 40 from the tuner 36 to the signal output by the decoder 18. Suppression diode D6 protects transistor Q8 when the descrambled drive pulse terminates which turns-off transistor Q8.

The component values of FIGS. 5–10 are listed below in Table 1.

TABLE 1

| COMPONENT | FIGURE NO. | SPECIFICATION |
| --- | --- | --- |
| C1 | 5 | 330 $\mu$F |
| C2 | 6 | 330 $\mu$F |
| C3 | 9 | 10.0 $\mu$F |
| C4 | 9 | 330 $\mu$F |
| C5 | 9 | 330 $\mu$F |
| C6 | 9 | .001, non polarized |
| C7 | 8 | 330 $\mu$F |
| C9 | 7 | .001 $\mu$F |
| C11 | 10 | 330 $\mu$F |
| D1 | 5 | 1N4148 |
| D2 | 9 | 1N4148 |
| D3 | 9 | 1N4148 |
| D6 | 8 | 1N4148 |
| IC1 | 9 | 741 op amp |
| K1 | 5 | Radio Shack 275-241 |
| K2 | 9 | Radio Shack 275-241 |
| K3 | 8 | Radio Shack 275-241 |
| L1 | 9 | 2.2 $\mu$H |
| L2 | 7 | 2.2 $\mu$H |
| Q1 | 5 | 2N3906 |
| Q2 | 6 | 2N3906 |

TABLE 1-continued

| COMPONENT | FIGURE NO. | SPECIFICATION |
|---|---|---|
| Q3 | 6 | 2N3904 |
| Q4 | 6 | CD4016 |
| Q5 | 6 | CD4016 |
| Q6 | 9 | 2N3906 |
| Q7 | 9 | 2N3904 |
| Q8 | 8 | 2N3906 |
| Q10 | 10 | 2N3904 |
| R1 | 5 | 1.0 kΩ |
| R2 | 5 | 3.3 kΩ |
| R3 | 6 | 1.0 kΩ |
| R4 | 6 | 3.3 kΩ |
| R5 | 6 | 3.3 kΩ |
| R6 | 6 | 10.0 kΩ |
| R7 | 6 | 3.3 kΩ |
| R8 | 6 | 4.7 kΩ |
| R9 | 9 | 1.0 kΩ |
| R10 | 9 | 3.3 kΩ |
| R11 | 9 | 1.0 kΩ |
| R12 | 9 | 10.0 kΩ |
| R13 | 9 | 1.0 kΩ |
| R14 | 9 | 10.0 kΩ |
| R15 | 9 | 2.0 kΩ |
| R16 | 9 | 2.2 kΩ |
| R17 | 9 | 1.5 kΩ |
| R18 | 8 | 10 kΩ |
| R19 | 8 | 3.3 kΩ |
| R20 | 8 | 75 Ω |
| R23 | 10 | 3.3 kΩ |
| R24 | 10 | 3.3KΩ |
| R25 | 10 | 1KΩ |

Since the decoder 18 automatically detects the presence of a scrambled CATV signal and the television 12 automatically detects the presence of a descrambled output signal from the decoder 18, no control messages are exchanged between the television 12 and the decoder 18.

Figure 12:
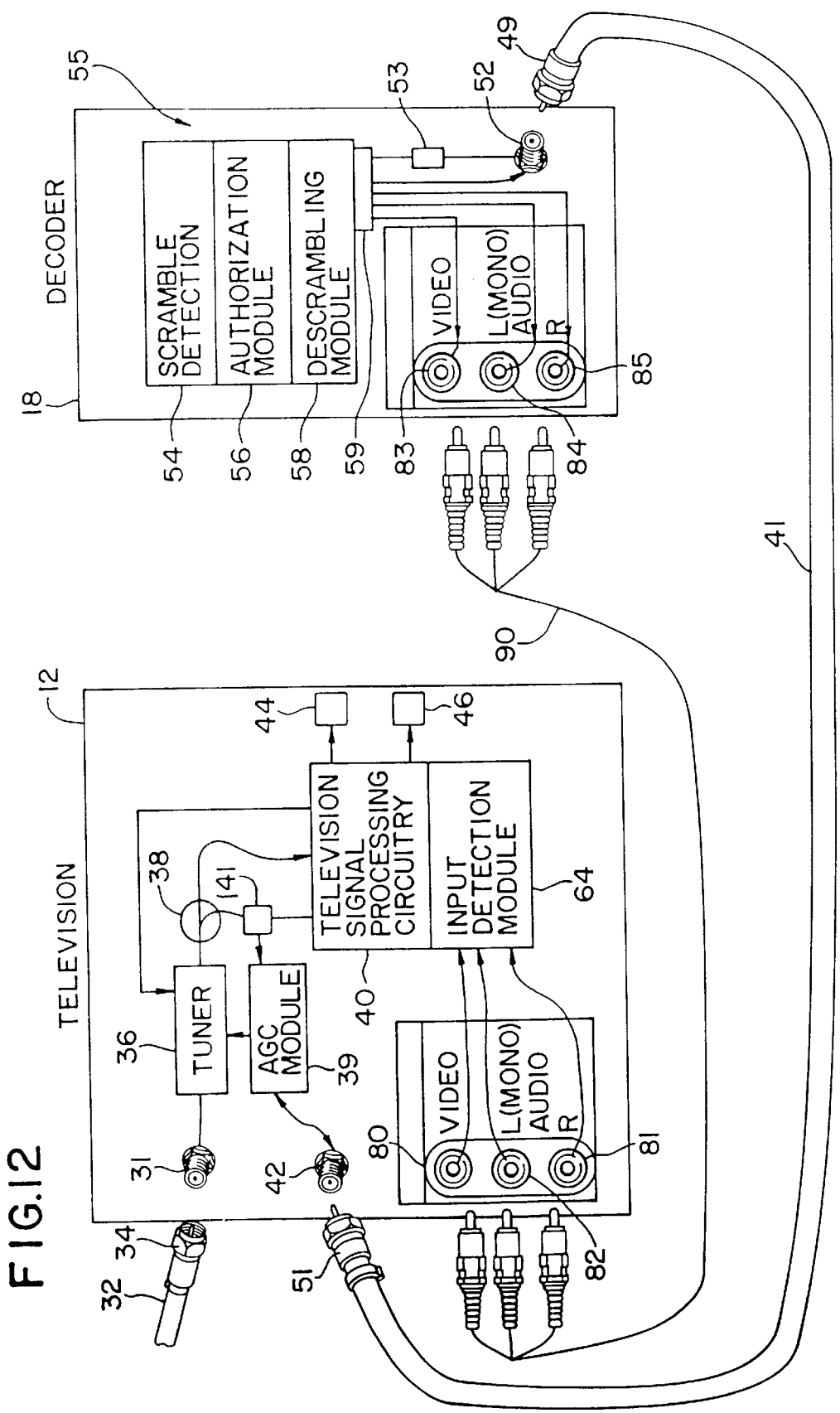
FIG. 12 is a block diagram of a first alternative embodiment of the receiver of FIG. 3.

The preferred embodiment will operate when analog scrambled signals are detected on the 6 MHz CATV channel. However, digital CATV systems multiplex a plurality of video and audio signals onto a single CATV channel. Accordingly, the television 12 must inform the decoder 18 which sub-channel of the digital multiplex to select. As shown in FIG. 12, the television signal processing circuitry 40 outputs a four to twelve bit sub-channel designation, or word, at a frequency above DC and below the IF carrier output to the decoder 18. A four bit word is required for up to 16 sub-carriers, and a twelve bit word is required if a true channel designator is desired. Preferably, the sub-channel number is output from the signal processing circuitry 40 on a 38 KHz carrier to a multiplexer 141. The decoder 18 detects the 38 KHz signal multiplexed with the IF carrier and forwards the sub-channel designation to the descrambling module 58 to descramble the desired sub-channel.

Those skilled in the art would appreciate that multiple decoders 18 may be connected in parallel via the IF/AGC port 42 by using a unity-gain signal splitter with a DC bypass. As described above, only a decoder 18 capable of descrambling the received signal will attempt to do so. The decoder will place a DC signal on the IF/AGC 41 line to control the tuner 36 amplifier gain. Descrambled A/V signals will be output to the appropriate ports 80, 81, 82 for detection by the input detection module 64.

Figure 13:
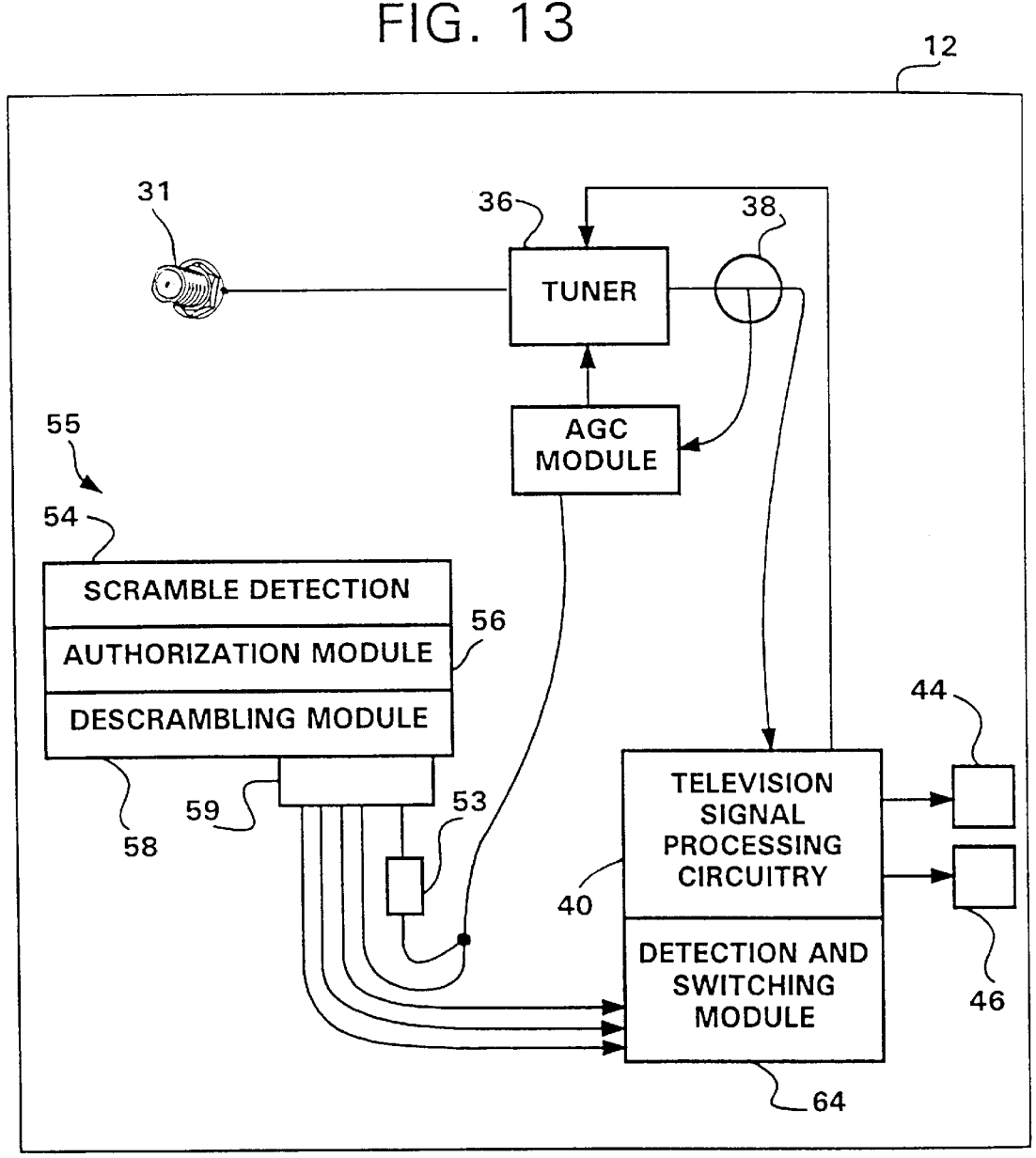
FIG. 13 is a block diagram of an alternative embodiment of the present invention.

Although the invention has been described in part by making detailed reference to the preferred embodiment, such detail is intended to be instructive rather than restrictive. For example, although the preferred embodiment of the decoder 18 is shown as a stand alone module, the decoder 18 may be incorporated as a module within the receiver, as shown in FIG. 13. It will be appreciated by those skilled in the art that many variations may be made in the structure and mode of the operation without departing the spirit and scope of the invention as disclosed in the teachings herein.

I claim:

1. A decoder, for detecting and descrambling scrambled CATV channel signals, for use in conjunction with a cable-ready receiver which receives a multichannel signal; wherein the cable-ready receiver includes a frequency agile tuner which receives said multichannel signal and outputs a selected CATV channel signal, the tuner output coupled to a video display and speaker unit; a receiver output port coupled to said tuner output for outputting the selected CATV signal; and an override input port for receiving a descrambled CATV channel signal from the decoder and for overriding the selected CATV signal output by the tuner to the video display and speaker unit when a descrambled signal is received at the override input port; the decoder comprising:

means for receiving a CATV channel signal output by the receiver output port;

means for detecting whether said received CATV channel signal is scrambled;

descrambling means for descrambling a scrambled CATV channel signal;

decoder output port means for outputting a descrambled CATV channel signal; and decoder output control means for controlling the output of said decoder output port means such that a signal is output therefrom only when a descrambled signal is detected, whereby the content of the selected CATV channel signal directly controls the operation of the decoder.

2. The decoder of claim 1 further comprising means for determining whether CATV channel signal is of the type to be descrambled by said descrambler.

3. A decoding system for coupling with a consumer electronic device to automatically descramble scrambled video program signals, each of which is transmitted on one of a plurality of radio frequency (RF) carrier and are received by said device; wherein said device includes means for displaying video program signals, a tuner for selecting one of said plurality of RF signals, downconverting said selected RF signal to an intermediate frequency (IF) signal and forwarding said IF signal to said decoding system, wherein said IF signal consists of an IF carrier and said video program signal; and input port means for receiving a descrambled video program signal from said decoding system; the decoding system comprising:

means for receiving said IF signal and downconverting said IF signal to output said video program signal;

means for analyzing said video program signal and determining whether said video program signal is scrambled;

means for descrambling said video program signal if scrambled; and output port means for outputting a descrambled video program signal to said input port means.

4. The decoding system of claim 3 further comprising means for determining whether said video program signal is of the type to be descrambled by said descrambling means.

\* \* \* \* \*